United States Patent [19]

Lindberg

[11] 4,172,437

[45] Oct. 30, 1979

[54] PCV FLOW REGULATOR

[75] Inventor: John E. Lindberg, Berkeley, Calif.

[73] Assignee: Owen, Wickersham & Erickson, San Francisco, Calif.

[21] Appl. No.: 793,602

[22] Filed: May 4, 1977

[51] Int. Cl.² .............................................. F02M 25/06
[52] U.S. Cl. .............................. 123/119 B; 123/119 D
[58] Field of Search ........ 123/119 B, 119 D, 119 EE; 137/480, 808, 810, 812, 813

[56] References Cited

U.S. PATENT DOCUMENTS

| | | | |
|---|---|---|---|
| 3,181,833 | 5/1965 | Adams et al. | 123/119 B X |
| 3,195,303 | 7/1965 | Widell | 137/813 X |
| 3,490,474 | 1/1970 | Larson | 137/812 |
| 3,542,005 | 11/1970 | Von Brimer | 123/119 B |
| 3,545,416 | 12/1970 | Von Brimer | 123/119 B |
| 3,754,538 | 8/1973 | Ephraim, Jr. et al. | 123/119 B X |
| 4,027,635 | 6/1977 | Goto et al. | 123/119 A |

Primary Examiner—Carlton R. Croyle
Assistant Examiner—Leonard E. Smith
Attorney, Agent, or Firm—Owen, Wickersham & Erickson

[57] ABSTRACT

A fluid flow regulator controls the amount of fluid flow or pressure of the fluid flowing through the regulator by producing an impedance to flow through the regulator which varies in relationship to the pressure differential across the regulator and which also varies in relationship to an acceleration in the fluid flowing through the regulator. The regulator has a shape which produces an acceleration in the fluid flowing through the regulator to cause the flow itself to vary the impedance to flow through the regulator. In a specific embodiment the fluid flow regulator is a vortex chamber and can be used as a replacement for existing, mechanical PCV valves for internal combustion engines. The flow regulator of the present invention provides a variable orifice valve function without any moving parts.

22 Claims, 6 Drawing Figures

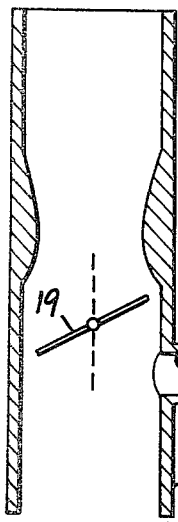
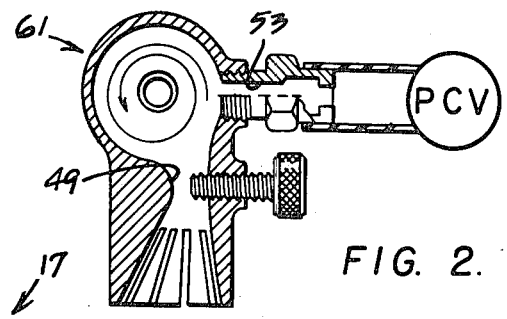
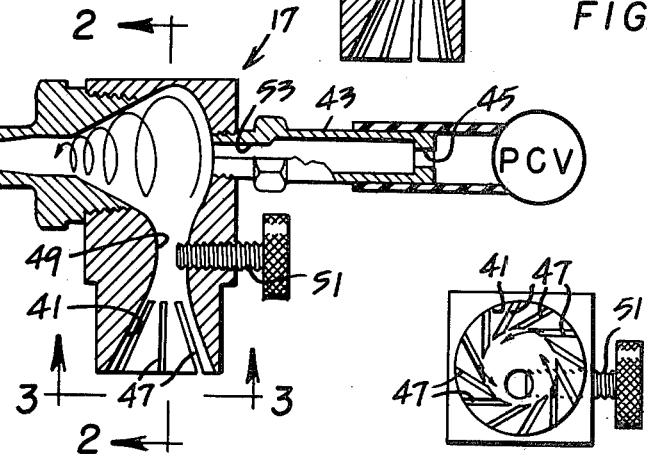
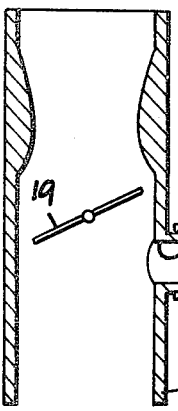
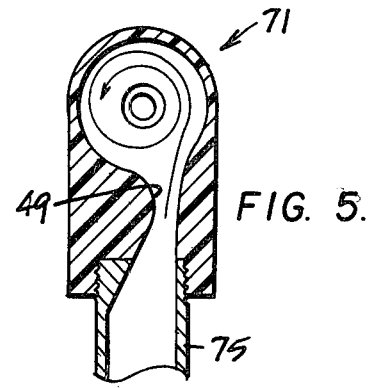
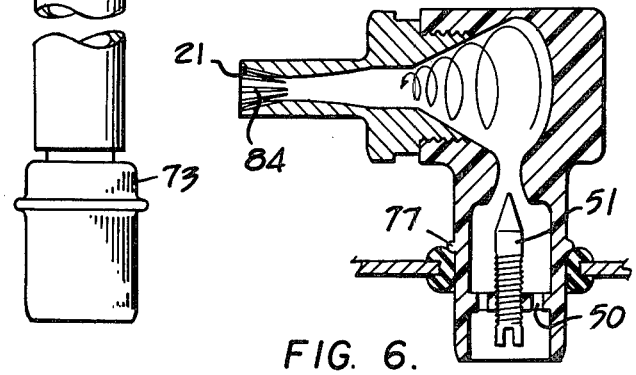

PCV FLOW REGULATOR

BACKGROUND OF THE INVENTION

The present invention relates to a fluid flow regulator for controlling the amount of fluid flow through the regulator and has specific application as a control valve for an internal combustion engine positive crankcase ventilation (PCV) system.

Existing PCV systems conduct crankcase blow-by gases to the intake manifold through a variable orifice valve, and the opening of this variable orifice valve is controlled by intake manifold vacuum. In existing PCV systems at high manifold vacuum the valve is closed; and a small orifice handles the flow. At manifold vacuums of 12 to 15 inches of mercury, the valve begins to open, thus increasing the flow capacity to handle the increased blow-by of the engine as the manifold vacuum decreases.

In the prior art PCV systems the valve is typically a mechanical valve having a tapered valve element that is spring loaded. The tapered valve element moves on and off the valve seat to an extent which is determined by the amount of intake vacuum to thereby provide the metering or regulation of the total amount of PCV gas flow in dependence upon the position of the valve element with respect to the valve seat.

The mechanical PCV valves of the prior art PCV systems present a number of problems.

The valve element itself is subjected to a great deal of mechanical abuse as it is moved back and forth and on and off the valve seat with changes in suction in the engine induction system. The PCV valve slams against the valve seat so hard that it tends to beat itself to death, and these valve elements therefore have to be made of specially hardened steel to provide any useful period of operation.

The mechanical operated PCV valve elements of the prior art also had a tendency to become gummed up by the PCV gases so as to cause sticking of the valve element on the valve seat. The gumming up problem can also cause a change of the orifice size prior to actual sticking; and both the changing of the orifice size and the actual sticking of the PCV valve caused substantial impairment of engine performance.

The prior art, mechanical type PCV valves also present maintenance problems. Major automobile manufacturers require that PCV valves be inspected every twelve months and replaced every two years.

It is a primary object of the present invention to construct a PCV flow regulator which provides a variable orifice valve function without any moving parts and which eliminates and avoids the problems of the prior art PCV valves.

SUMMARY OF THE PRESENT INVENTION

The present invention comprises a fluid flow regulator which provides a variable orifice valve function without any moving parts.

The fluid flow regulator controls the amount of fluid flow or pressure of the fluid flowing through the regulator by producing an impedance to flow through the regulator which varies in relationship to the pressure differential across the regulator and which also varies in relationship to an acceleration in the fluid flowing through the regulator. The regulator has a shape which produces an acceleration in the fluid flowing through the regulator to cause the flow itself to vary the impedance to flow through the regulator.

In a specific embodiment the fluid flow regulator is used as a replacement for existing, mechanical PCV valves for internal combustion engines. The flow regulator has an inlet and an outlet and a variable impedance producing structure between the inlet and the outlet.

In one particular embodiment the structure which produces the variable impedance comprises a vortex chamber which imparts a swirl to the fluid flowing between the inlet and the outlet. A control orifice may be located in either the inlet or the outlet and is formed with a size matched to the displacement of the engine for providing further control of the impedance.

The inlet may include a shaped opening having a varying internal diameter for permitting a swirl to be produced in the incoming fluid to provide a controlled choking of the flow through the inlet. Slots may also be formed in the sidewall of the inlet and arranged tangentially with the inner surface for producing a swirl of the fluid flowing through the inlet.

The PCV flow regulator using the vortex chamber holds the PCV flow more stable than a movable plunger PCV valve and accomplishes this function without any moving parts.

The outlet preferably has an inner surface formed with a plurality of grooves for providing turbulent mixing and ultrasonic wave fronts in the outlet fluid flow. This outlet, in the PCV valve embodiment of the present invention, is connected to an entrance to the induction system of the engine below the butterfly valve.

In one form of the invention the inlet includes an adapter for insertion into the existing PCV outlet of the engine. In another form of the invention, the adapter is formed as an integral part of the flow regulator housing so that the flow regulator housing is mounted directly into the existing PCV opening of the engine.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a side elevation view, partly in cross section to show details of construction, of a PCV control valve system incorporating a vortex chamber as the control valve element. FIG. 1 also incorporates a variable, adjustable air bleed inlet to the PCV vortex chamber.

FIG. 2 is a cross sectional view, taken along the line and in the direction indicated by the arrows 2—2 in FIG. 1 but showing an alternate embodiment of the PCV control valve in which alternate embodiment the PCV gases do not enter on the axis of the vortex chamber but instead enter perpendicular to the air bleed flow entrance as shown in FIG. 2.

FIG. 3 is a view taken along the line and in the direction indicated by the arrows 3—3 in FIG. 1.

FIG. 4 is a side elevation view of another embodiment of a PCV control valve system incorporating a vortex chamber as the control valve. In the FIG. 4 embodiment the PCV gases are introduced to the vortex chamber tangentially.

FIG. 5 is a view taken along the line and in the direction indicated by the arrows 5—5 in FIG. 4.

FIG. 6 is a view like FIG. 4 but showing an embodiment of the invention in which the PCV valve adapter is made an integral part of the vortex chamber housing structure so that the lower end of the housing can be inserted directly into the existing opening in the rocker box cover of the engine. The FIG. 6 embodiment eliminates the need for the adapter shown in the FIG. 4 embodiment.

DETAILED DESCRIPTION OF THE PREFERRED EMBODIMENTS

FIG. 1 is a side elevation view, partly in cross section to show details of construction of a PCV control valve system incorporating a vortex chamber as the control valve element. The PCV control valve system is indicated generally in FIG. 1 by the reference numeral 17, and the system 17 also incorporates a variable, adjustable air bleed inlet to the PCV vortex chamber.

The air-PCV gas vortex chamber 17 preferably includes a shaped inlet 41 for admitting air and a conduit 43, having an internal control orifice 45, for admitting PCV gases. However, this shaped inlet and swirl produced by slots 47 (as described in more detail below) are not essential. The vortex chamber 17 can be used along with a straight inlet.

The shaped air inlet 41 includes a plurality of slots 47 which, as best illustrated in FIG. 3, are disposed tangentially to the inner surface of the opening 41 for providing swirling motion of the incoming air in the direction indicated by the arrows in FIG. 3. This, in effect, produces two vortexes in series—a vortex within the inlet and a second vortex within the vortex chamber 17.

The curved opening 41 tapers down to a throat 49, and an adjustable screw 51 enables the diameter of the throat to be varied. The screw 51 shown in the FIG. 1 embodiment enables the effective diameter of the throat to be varied but can cause some distortion of flow. The more preferred form of the adjustable screw 51 is shown in FIG. 6. In FIG. 6 the screw 51 is maintained concentric with the throat area throughout all adjustment of the screw 51 to avoid flow distortion. The screw 51 in FIG. 6 is mounted in a flange that has openings 50 for flow off fluid to the orifice 49. The FIG. 6 embodiment can also be incorporated in this FIG. 1 structure, and in this case the mounting plate extends across the entire lower end of the passageway 41 and does not necessarily include openings 50 so that the entire flow of incoming air must pass through the slots 47.

The throat 49 opens into the interior of the vortex chamber 17 on a tangential path so that the incoming air produces a swirling motion with the vortex chamber.

The end 53 of the PCV gas conduit 43 is aligned axially and on the center of the swirling gases, so that the swirling gases produce a suction effect on the end 53. The general principle of operation of the air-PCV vortex chamber 17 is to produce a mass flow through the vortex chamber which is dependent upon the pressure differential between the inlet and the outlet of the vortex chamber and the acceleration of flow within the vortex chamber. However, the air-PCV vortex chamber of the FIG. 1 embodiment of the present invention has an entrance construction which regulates the mass flow through the vortex chamber in dependence upon the restricting or choking effect produced by the spin imparted to the air flowing through the shaped opening 41. Thus, the shaped opening 41, in combination with the slots 47 and the adjustable screw 51 at the throat 49 provide for controlled variation of the mass flow through the air-PCV vortex chamber 17, and this control acts in series with the regulation of the mass flow provided by the spin imparted by the inner surface of the vortex chamber itself.

The inner surface 21 of the outlet of the vortex chamber 17 is preferably formed with grooves 84 which produce turbulent mixing and an ultrasonic effect.

In a particular embodiment of the vortex chamber 17 the diameter of the orifice 45 is 0.1 inch.

The internal diameter of the inlet 53 is 0.210 inch. The maximum internal diameter of the vortex chamber 17 is 0.750 inch.

The minimum diameter of the throat 49, without adjustment of the screw 51, is 0.3125 inch. The screw 51 permits the diameter to be adjusted down to the equivalent of 0.156 inch.

The minimum diameter of the outlet throat 85 is 0.25 inch. The maximum depth of the slots 38 and 84 is 0.05 inch.

The slots 47 have a width of approximately 0.05 inch.

In the operation of the air-PCV gas vortex chamber 17 shown in FIG. 1, the maximum pressure differential between the inlet 41 and the outlet 21 of the vortex chamber 17 occurs at idle, but the PCV-gas flow through the conduit 43 under idle operation of the engine is basically the same as throughout the normal cruising power range. This results because the construction and operation of the inlet 41 provide a choking effect under high engine intake manifold vacuum conditions to restrict intake air flow through the shaped opening 41 and this restriction works in combination with the mass flow stabilizing effect of the vortex chamber itself under changing vacuum conditions within the intake manifold to provide a substantially stabilized flow of PCV gases throughout the operating range of the engine. In this regard, the spinning and restricting effect of the shaped opening 41 decreases as the vacuum below the butterfly valve decreases to permit freer flow of air through the throat 49 into the vortex chamber 17 as the engine power levels go up.

FIG. 2 is a cross-sectional view which is oriented along the line in the direction indicated by the arrows 2—2 in FIG. 1. Howvever, FIG. 2 actually shows an alternate embodiment 61 of the PCV control valve. In this alternate embodiment, the PCV gases do not enter on the axis of the vortex chamber, but instead enter perpendicular to the axis bleed flow entrance 49. That is, the inlet 53 to the vortex chamber for the PCV gases comes in perpendicular to the flow of spinning air that is coming through the air inlet 49. At the point 53, a vacuum is created which is comparable to the vacuum created by the corresponding opening 53 of the FIG. 1 embodiment, which opening in the FIG. 1 embodiment is aligned with the axis of spin of the air within the vortex chamber.

The FIG. 2 embodiment thus provides flexibility in construction of the vortex chamber so that the particular PCV gas entrance 53 can be located in either the FIG. 1 or the FIG. 2 location, depending upon which location is most convenient for a particular application.

FIG. 4 is a side elevation view of another embodiment of a PCV control valve system incorporating a vortex chamber as a control valve. In the FIG. 4 embodiment, the PCV control valve system is indicated generally by the reference numeral 71.

Both the FIG. 4 embodiment (and the FIG. 6 embodiment to be described below) are direct replacements for existing PCV valves, and the FIG. 4 and FIG. 6 embodiments of the present invention provide the valving function without any moving parts.

The FIG. 6 embodiment is basically the same construction, and operates in substantially the same way as the FIG. 4 embodiment, so far as the vortex chamber valve itself is concerned. The FIG. 4 embodiment incorporates an adapter 73 used with the inlet conduit 75 so that the adapter 73 can be placed directly into the existing opening in the rocker box of the engine in place of the original PCV valve.

The FIG. 6 embodiment incorporates an adapter shape 77 molded as a part of the vortex chamber housing itself so that the housing can be inserted directly into the existing opening in the rocker box cover in place of the conventional PCV valve.

The structure of the vortex chamber itself in both the FIG. 4 embodiment and the FIG. 5 embodiment is substantially the same as that of the FIG. 1 embodiment, but without the curved inlet 41, slots 47, or adjustment screw 51.

The FIG. 4 embodiment, as compared with the FIG. 6 embodiment, provides the posibility of a minimum length of travel between the outlet of the vortex chamber 21 and the PCV opening.

The FIG. 6 embodiment offers the advantage of simplicity of the unitary, one piece assembly capable of being inserted directly into the existing opening in the rocker box cover without any additional or auxiliary adapter units.

The FIG. 4 embodiment maximizes the turbulent intermixing of the PCV gases with the air fuel mixture downstream of the butterfly valve 19 because of the short length of the connection between the vortex chamber and ported vent opening.

In each of the vortex chamber valve constructions shown in FIGS. 4 and 5, there is a control orifice 49 which serves the purpose of matching the flow of the PCV gases to the cubic inch displacement of the engine. Orifice 45 provides this function in FIG. 1.

The reason that the PCV vortex chamber valve systems shown in the various drawings work without moving parts is that the inherent characteristics of the vortex chamber act as a variable impedance flow restricting device. That is, the vortex chamber itself, in its simplest form, provides an impedance to the flow through the vortex chamber which is a square root function of the pressure differential between the inlet and outlet of the vortex chamber (again assuming a simple vortex chamber without any inlet choking or restriction).

The vortex chamber valve of the present invention has been found, by actual installation and testing, to entirely replace existing mechanical valve PCV valve constructions while providing greater flow stabilization of the PCV gases throughout the power operating range of the engine than provided by mechanical, moving part, suction operated existing PCV valves.

The vortex chamber valve construction of the present inventon also has the distinct benefit of being substantially less subject to gumming up than mechanical moving valve type PCV valves.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A positive crankcase ventilation system, including in combination:

an internal combustion engine having a crankcase and an induction system with an intake manifold, PCV means for conducting crankcase blow-by gases to said intake manifold, and a fluid flow regulator in said PCV means for regulating the amount of PCV fluid flow from said crankcase to said intake manifold and effective to serve as a variable orifice valve without any moving parts, said fluid flow regulator comprising, inlet means for admitting PCV fluid flow from said crankcase into the flow regulator, outlet means for conducting fluid flow from the regulator to said intake manifold, the outlet means including an inner surface formed with a plurality of grooves for providing turbulent mixing and ultrasonic wave fronts in the outlet fluid flow, and variable impedance means between the inlet means and the outlet means for producing an impedance to flow through the flow regulator which varies in relationship to the pressure differential across the variable impedance means and which also varies in relationship to an acceleration in the fluid flowing through the variable impedance means, said variable impedance means having a configuration which produces an acceleration in the fluid flowing through the variable impedance means.

2. A positive crankcase ventilation system, including in combination:

an internal combustion engine having a crankcase and an induction system with an intake manifold, PCV means for conducting crankcase blow-by gases to said intake manifold, and a fluid flow regulator in said PCV means for regulating the amount of PCV fluid flow from said crankcase to said intake manifold and effective to serve as a variable orifice valve without any moving parts, said fluid flow regulator comprising, inlet means for admitting PCV fluid flow from said crankcase into the flow regulator, outlet means for conducting fluid flow from the regulator to said intake manifold, and variable impedance means between the inlet means and the outlet means for producing an impedance to flow through the flow regulator which varies in relationship to the pressure differential across the variable impedance means and which also varies in relationship to an acceleration in the fluid flowing through the variable impedance means, said variable impedance means having a configuration which produces an acceleration in the fluid flowing through the variable impedance means, the inlet means including a first, shaped opening having a varying internal diameter for permitting a swirl to be produced in the inflowing fluid to provide a controlled choking of the flow through said first inlet opening, and a plurality of slots extending through the sidewall of said first inlet and aligned tangentially with the inner surface of said first inlet for producing a swirl of the fluid flowing through said first inlet.

3. A positive crankcase ventilation system, including in combination:
   an internal combustion engine having a crankcase and an induction system with an intake manifold,
   PCV means for conducting crankcase blow-by gases to said intake manifold, and
   a fluid flow regulator in said PCV means for regulating the amount of PCV fluid flow from said crankcase to said intake manifold and effective to serve as a variable orifice valve without any moving parts, said fluid flow regulator comprising,
   inlet means for admitting PCV fluid flow from said crankcase into the flow regulator,
   outlet means for conducting fluid flow from the regulator to said intake manifold, and
   variable impedance means between the inlet means and the outlet means for producing an impedance to flow through the flow regulator which varies in relationship to the pressure differential across the variable impedance means and which also varies in relationship to an acceleration in the fluid flowing through the variable impedance means,
   said variable impedance means having a configuration which produces an acceleration in the fluid flowing through the variable impedance means,
   the variable impedance means comprising a vortex chamber which imparts a swirl to the fluid flowing between the inlet means and the outlet means,
   the inlet means comprising a single inlet for admitting only PCV fluid flow into the interior of the vortex chamber, the inlet means admitting the PCV fluid tangentially to the inner surface of the vortex chamber.

4. The system defined in claim 3 wherein the inlet means include a restrictor which is matched to the displacement of the engine on which the flow regulator is installed.

5. The system defined in claim 3 wherein the inlet means includes a restrictor which is matched to the displacement of the engine on which the flow regulator is installed and including adjustment means for varying the size of said restrictor.

6. The system defined in claim 5 wherein the adjustment means include an adjustment screw which has a tapered end adjustably positionable with respect to the restrictor and wherein the adjustment screw is coaxially aligned with the restrictor to avoid distortion of the flow at any adjusted position of the adjustment screw.

7. A positive crankcase ventilation system, including in combination:
   an internal combustion engine having a crankcase and an induction system with an intake manifold,
   PCV means for conducting crankcase blow-by gases to said intake manifold, and
   a fluid flow regulator in said PCV means for regulating the amount of PCV fluid flow from said crankcase to said intake manifold and effective to serve as a variable orifice valve without any moving parts, said fluid flow regulator comprising,
   inlet means for admitting PCV fluid flow from said crankcase into the flow regulator,
   outlet means for conducting fluid flow from the regulator to said intake manifold, and
   variable impedance means between the inlet means and the outlet means for producing an impedance to flow through the flow regulator which varies in relationship to the pressure differential across the variable impedance means and which also varies in relationship to an acceleration in the fluid flowing through the varible impedance means,
   said variable impedance means having a configuration which produces an acceleration in the fluid flowing through the variable impedance means.

8. The system defined in claim 7 including a control orifice located in one of the inlet and outlet means and having a size matched to the displacement of the engine with which the flow regulator is associated for providing further control of the impedance of the flow regulator.

9. The system defined in claim 7 wherein the variable impedance means comprise a vortex chamber which imparts a swirl to the fluid flowing between the inlet means and the outlet means.

10. The system defined in claim 9 and wherein the inlet means comprise a single inlet for admitting only PCV fluid flow into the interior of the vortex chamber.

11. The system defined in claim 7 wherein the engine induction system has a butterfly valve, and the outlet means are connected to an entrance to the induction system of the engine below the butterfly valve.

12. The system defined in claim 11 for use in an engine having an existing PCV system with an outlet, wherein the inlet means include an adapter for insertion in the existing PCV outlet of the engine.

13. The system defined in claim 12 wherein the outlet means include a separate extension tube between the PCV adapter and the variable impedance means.

14. The system defined in claim 12 wherein the adapter is formed as an integral part of a flow regulator housing so that the flow regulator housing is mounted directly into the existing PCV outlet and including an extension tube for connecting the outlet means to the inlet opening in the induction system.

15. The system defined in claim 7 wherein the inlet means include a first, shaped opening having a varying internal diameter for permitting a swirl to be produced in the inflowing fluid to provide a controlled choking of the flow through said first inlet opening.

16. The system defined in claim 15 wherein the first inlet includes a restrictor for regulating the amount of fluid flow through the first inlet.

17. The system defined in claim 16 including adjustment means for varying the size of said restrictor.

18. The system defined in claim 15 wherein the first inlet opening is an air inlet and wherein the inlet means also includes a second inlet for admitting PCV gases to the interior of the variable impedance means.

19. The system defined in claim 18 wherein the second inlet includes a restrictor which is matched to the displacement of the engine on which the flow regulator is installed.

20. The system defined in claim 18 wherein the variable impedance means is a vortex chamber and the first inlet admits the first fluid tangentially to the inner surface of the vortex chamber.

21. The system defined in claim 20 wherein the second inlet admits the second fluid axially into the vortex chamber on the axis of spin produced by the first fluid within the vortex chamber.

22. The system defined in claim 20 wherein the second inlet means admit the second fluid in a direction which is perpendicular to the axis of rotation of the spin produced by the first fluid within the vortex chamber.

* * * * *